United States Patent
Markowitz et al.

(10) Patent No.: US 6,311,185 B1
(45) Date of Patent: *Oct. 30, 2001

(54) METHOD AND APPARATUS FOR MODIFYING AN INFORMATION PAGE TRANSMITTED IN A COMMUNICATIONS NETWORK

(75) Inventors: Robert Edward Markowitz, Glen Rock, NJ (US); Joseph Thomas O'Neil, Staten Island, NY (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,487

(22) Filed: Oct. 30, 1997

(51) Int. Cl.[7] ..................................................... G06F 17/30
(52) U.S. Cl. ............................. 707/10; 707/104; 707/501; 707/528; 705/10; 705/14; 705/26; 709/203
(58) Field of Search .................................... 707/1, 2, 3, 8, 707/9, 10, 100, 102, 103, 104, 203, 501, 511, 513, 514, 516, 522, 528, 529, 531, 902; 395/200.47, 200.49, 200.48, 200.59, 200.33, 200.23; 705/10, 14, 1, 1 D, 22, 26–28; 709/200–203

(56) References Cited

U.S. PATENT DOCUMENTS

| 5,513,254 | 4/1996 | Markowitz | 379/100.17 |
|---|---|---|---|
| 5,572,643 | 11/1996 | Judson | 395/200.48 |
| 5,737,619 | * 4/1998 | Judson | 707/500 |
| 5,794,210 | * 8/1998 | Goldhaber et al. | 705/14 |
| 5,796,952 | * 8/1998 | Davis et al. | 395/200.54 |
| 5,809,242 | * 9/1998 | Shaw et al. | 395/200.47 |
| 5,812,776 | * 9/1998 | Gifford | 395/200.47 |
| 5,860,073 | * 1/1999 | Ferrel et al. | 707/522 |
| 5,960,409 | * 9/1999 | Wexler | 705/14 |

OTHER PUBLICATIONS

Ball T et al., An internet difference engine and its applications, IEEE 1996, 71–76, Feb. 1996.*
Microsoft Announces Microsoft Internet Explorer 4.0, Or Newswire, Apr. 8, 1997.*
Moody, Glyn, Cautions push may pay dividends for Microsoft (push technology in Microsoft's Internet explorer 4 web browser software)(product development), computer weekly, p52(1), Sep. 11, 1997.*
FirstFloor Software, Inc., FirstFloor smart delivery channel suite to be featured at internet showcase; server product enables application developers to build business notification and document delivery channels for the Internet Explorer 4.0 platform, Apr. 1997.*
Levitt, Jason, Push your web pages. (Netscape's Netcaster in the communicator web software, and Microsoft's channel definition format in the Internet explorer 4.0 browser support push technology)(software review)(evaluation), InformationWeek, n634, p57(4), Jun. 1997.*
Fred Douglis et al., Tracking and viewing changes on the web, proceedings of the USENIX 1996 annual technical conference, and 1–13, Jan. 1996.*

* cited by examiner

Primary Examiner—Jack M. Choules
Assistant Examiner—Srirama Channavajjala
(74) Attorney, Agent, or Firm—Kenyon & Kenyon

(57) ABSTRACT

A method and apparatus for modifying an information page transmitted in a communications network, such as the Internet. A request to display an information page is received from a client computer. Information page data, such as hypertext markup language data, is obtained for the requested information page. Additional data, such as an advertisement, is selected and the information page data is modified to include the additional data based on attributes of the requested information page. The modified information page data is then sent to the client computer for display.

32 Claims, 4 Drawing Sheets

METHOD AND APPARATUS FOR MODIFYING AN INFORMATION PAGE TRANSMITTED IN A COMMUNICATIONS NETWORK

FIELD OF THE INVENTION

The invention relates to the transmission of information pages in a communications network. More particularly, the invention relates to a method and apparatus for modifying an information page transmitted in a communications network, such as the Internet.

BACKGROUND OF THE INVENTION

A communications network, such as the Internet, can transmit pages of information to a user's computer for display by a software program called a "browser." One example of such an information page is used in the World Wide Web, which transmits information pages over the Internet using hypertext markup language (HTML). The HTML data can include codes that tell the browser how to display the page, including, for example, the location and color of text and graphics. In general, a Web page can include combinations of text, graphics, sound, video and small application programs, such as "applets" which could be written in the Java computer language developed by Sun Microsystems in Palo Alto, Calif. A Web page can also include a "link" which, when selected by a user, results in the automatic display of another Web page. The Netscape Navigator browser, available from Netscape Communications Corporation in Mountain View, Calif., is one example of a browser that can display Web pages to a user.

Businesses that create and maintain Web pages, also known as "content providers," often generate revenue by displaying advertisements on their Web pages. This is typically done by including an advertisement directly in the original HTML data that defines a Web page. For example, a Web page containing travel tips and information could include HTML codes that place a hotel advertisement banner at the top of the page. Such an advertisement is similar to a newspaper advertisement in that it is included as part of the Web page itself. As a result, only the content provider can update or change the advertisement.

There are several disadvantages to incorporating advertisements in the original HTML data defining a Web page. One problem is that a business that only transmits Web pages created by content providers, such as an Internet Service Provider (ISP), does not generate the original HTML data defining a Web page, and, therefore, cannot include such advertisements on any of the Web pages it transmits. As a result, the ISP does not generate advertising revenue and must charge consumers more for Internet service. Moreover, the ISP is not able to easily advertise its own business, such as special rates or services, to people using their service.

Another disadvantage to including advertisements in the original HTML data defining a Web page is that advertisers must deal separately with hundreds, if not thousands, of individual content providers to coordinate an advertising campaign. If a large ISP could place advertisements on the Web pages it transmits, an advertiser could instead deal more simply and efficiently with one party. Moreover, a small content provider may not have the resources available to customize the display of advertisements. A large ISP, however, could select advertisements based, for example, on the user's age and the types of Web pages the user has visited in the past.

Even if an ISP could add an advertisement onto a Web page, the following problems would still exist. If the ISP simply overlaid all advertisements, for example, on the bottom right corner of every Web page, important information on the underlying Web page could be obscured. U.S. Pat. No. 5,513,254, issued Apr. 30, 1996, discloses a method and apparatus solving a similar problem when adding advertisements to a facsimile transmission. Another problem is that an advertisement mechanically added to a Web page might not stand out because of the colors of the advertisement and underlying Web page.

In view of the foregoing, it can be appreciated that a substantial need exists for a method and apparatus for modifying an information page transmitted in a communications network that lets an advertisement be added without obscuring information on the original Web page and solving the other problems discussed above.

SUMMARY OF THE INVENTION

The disadvantages of the art are alleviated to a great extent by the method and apparatus for modifying an information page, such as a Web page, transmitted in a communications network, such as the Internet. First, a request to display an information page is received from a client computer. Information page data, such as hypertext markup language data, is obtained for the requested information page. Additional data, such as an advertisement, is selected and the information page data is modified to include the additional data based on attributes of the requested information page. The modified information page data is then sent to the client computer for display to a user.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
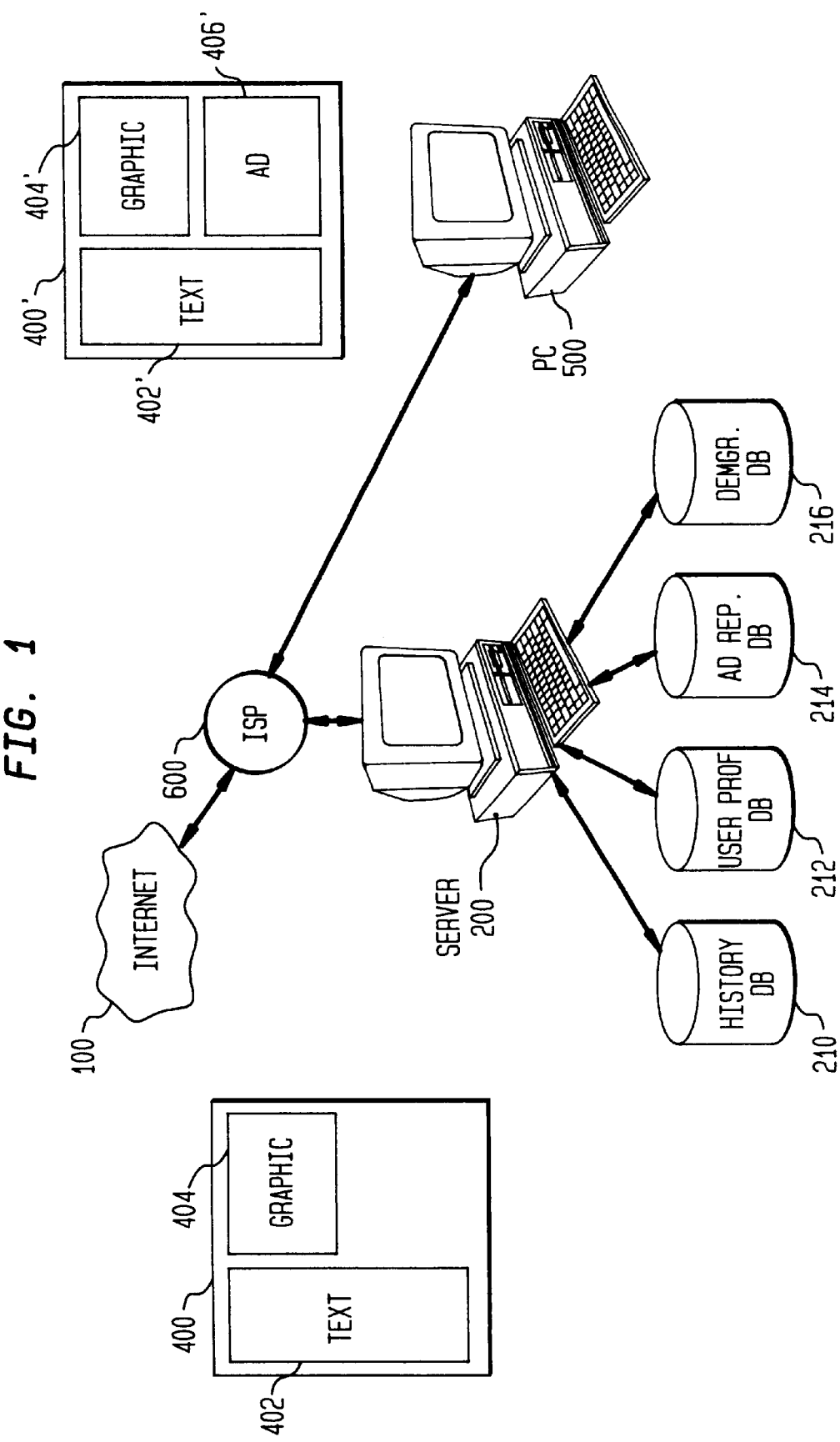
FIG. 1 is a block diagram of a system including an embodiment of the present invention.

The present invention is directed to a method and apparatus for modifying an information page transmitted in a communications network. Referring now in detail to the drawings wherein like parts are designated by like reference numerals throughout, there is illustrated in FIG. 1 a block diagram of a system including an embodiment of the present invention. The system includes a user computer 500, such as a personal computer (PC), that communicates with the Internet 100 through an ISP 600. An intelligent central server 200 is located at the ISP 600. Whenever a user at the PC 500 requests that an information page, such as a Web page 400, be displayed on his or her browser, the request is sent to the ISP 600. The ISP 600 can obtain the HTML data related to the Web page 400 from, for example, the Internet 100.

According to the present invention, the server 200 can select an advertisement from an advertisement repository database 214. The advertisement could include text, video, audio, and anything else supported in the communications network. A history database 210 can be consulted by the server 200 when selecting the advertisement. For example, if a user had previously requested a large number of Web pages related to sports, an advertisement for a sporting goods store might be selected. The Web page 400 currently being requested can similarly be used to select an appropriate advertisement. The server 200 can also look to a user profile database 212 when selecting the advertisement. The user profile database 212 might include information obtained from a questionnaire submitted when a user registered with the ISP 600. Information such as the user's age, sex and hobbies would obviously be a valuable aid when choosing an effective advertisement. Finally, a demographic database 216, perhaps including psychographic information joining demographic characteristics with attitudes, opinions and interests, could similarly be used when selecting the advertisement.

In addition to selecting an advertisement, the server 200 can examine the HTML data related to the requested Web page 400. The server 200 can determine the specific attributes of the Web page 400, such as the presence and location of text and graphics and the colors of the text, graphics and background, and decide how the selected advertisement can best be added. For example, the Web page 400 includes a text region 402 and a graphic region 404. Because the lower right hand corner of the Web page 400 is blank or empty, the server 200 might decide to add the selected advertisement to that area. The advertisement can be positioned to stand out from the original Web page 400 without obscuring any information, and the size and color of the advertisement can be adjusted to this end. If an advertisement uses black lettering and the original Web page 400 has a dark background, the server 200 might make the lettering in the advertisement white. Moreover, the server 200 could modify the HTML of the original Web page 400 to move and/or shrink the text and graphic regions 402, 404.

The server 200 then modifies the original HTML data to appropriately apply the advertisement. This modified HTML data is sent to the PC 500, resulting in the display of a modified Web page 400' having a text region 402', a graphic region 404' and the advertisement 406'. The text and graphic regions in the modified Web page 400' can be identical to the text and graphic regions of the original Web page 400. Because the advertisement 406' is directly incorporated into the HTML page by modifying the HTML code, special effects are possible, such as, for example: multiple advertisements can be "layered," advertisements can be made to slowly fade away, or a small semi-transparent logo can be placed on top of the original Web page.

The time required for the ISP 600 or server 200 to select an advertisement and modify the HTML code associated with the original Web page 400 could result in a small delay before the modified Web page 400' is displayed to the user on the PC 500. Moreover, the time required to download the page could be increased due to the additional advertising information. It should be noted, however, that this service could be offered by an ISP 600 in return for a discounted service cost to the user.

Figure 2:
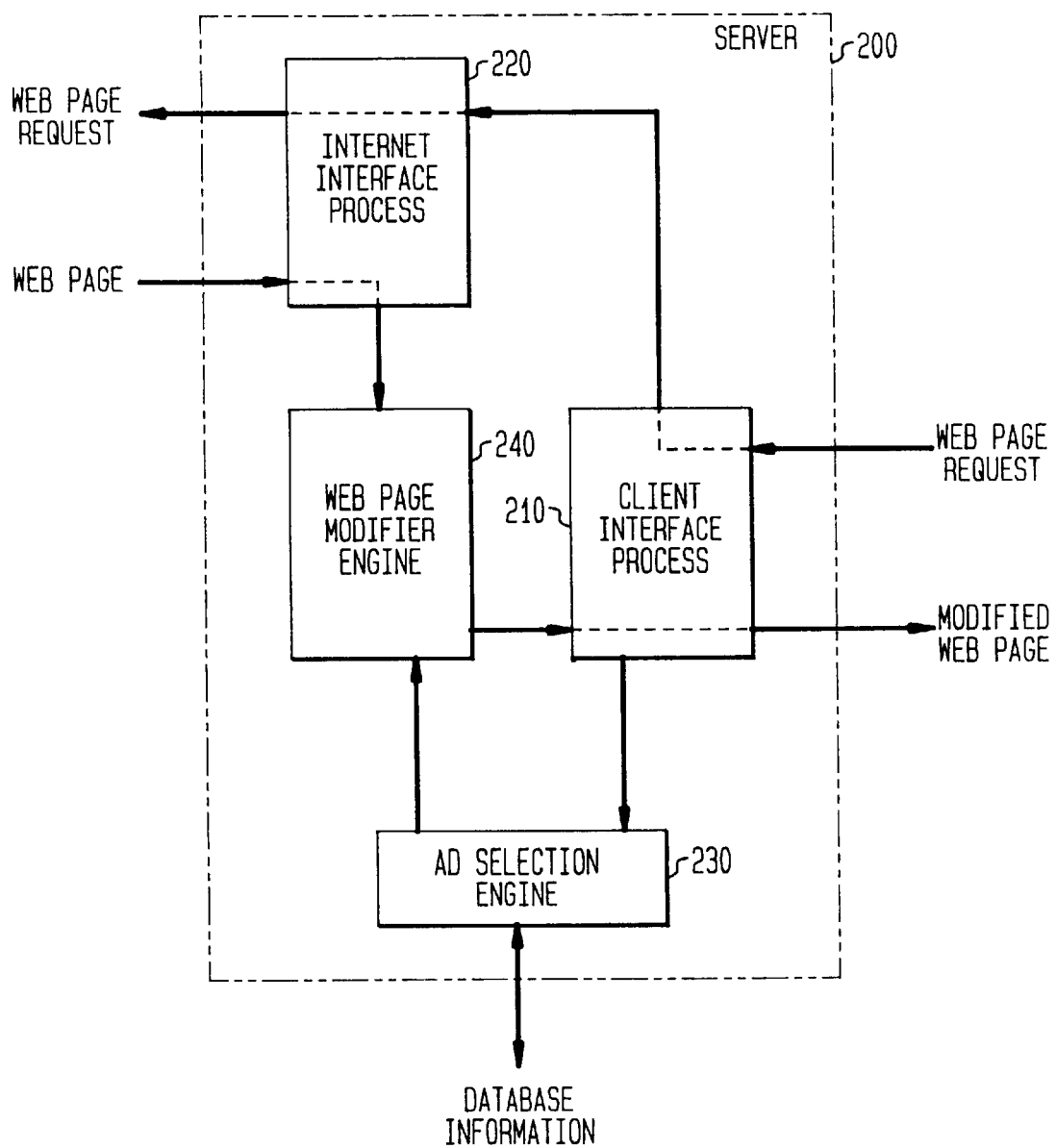
FIG. 2 is a block diagram of a software architecture that could be used in the server shown in FIG. 1.

FIG. 2 is a block diagram of a software architecture that could be used in the server 200 shown in FIG. 1. A Web page request is received from a user by a client interface process 210. The server 200 requests the Web page through an Internet interface process 220, which also receives the original HTML code related to the requested Web page. As explained in detail with respect to FIG. 1, an advertisement selection engine 230 selects the appropriate advertisement from an advertisement repository. A Web page modifier engine 240 examines the HTML code related to the requested Web page and inserts the selected advertisement based on the attributes of the requested Web page. The modified HTML code is then sent to the user through the client interface process 210.

Figure 3:
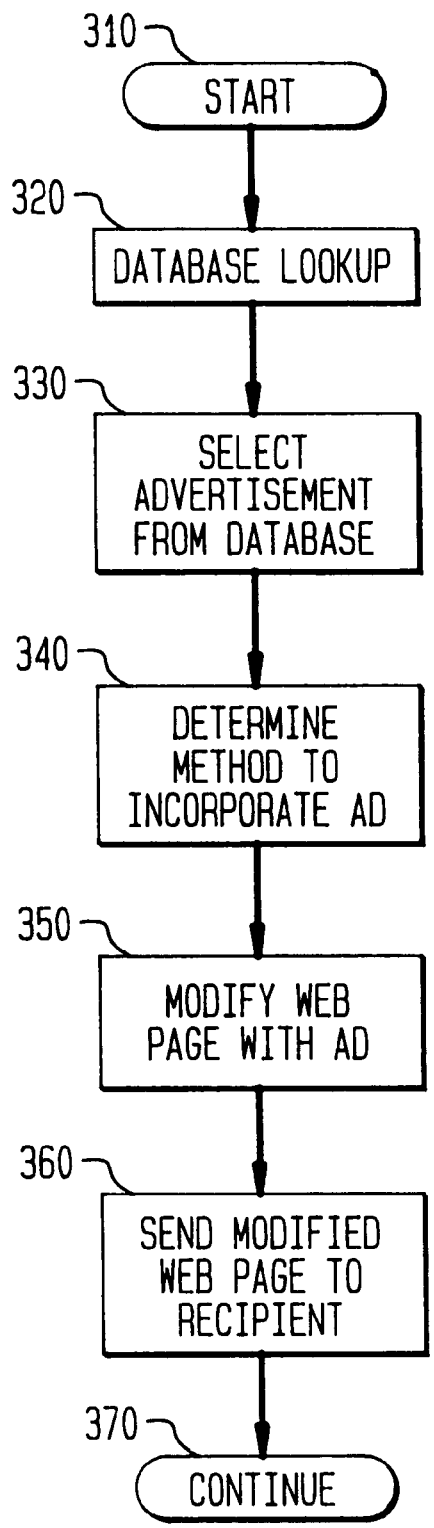
FIG. 3 is a block diagram of a process according to an embodiment of the present invention.

FIG. 3 is a block diagram of a process according to an embodiment of the present invention. When the process is initiated at step 310, the relevant information is accessed in the various databases at step 320 as described in detail with respect to FIG. 1. An appropriate advertisement is selected from the advertisement repository database at step 330 and the appropriate method of incorporating the advertisement into the Web page, based on the attributes of the Web page, is determined at step 340. The original HTML data associated with the Web page is modified with the advertisement at step 350. Finally, the modified Web page is sent to the recipient at step 360 before the process continues at step 370.

Figure 4:
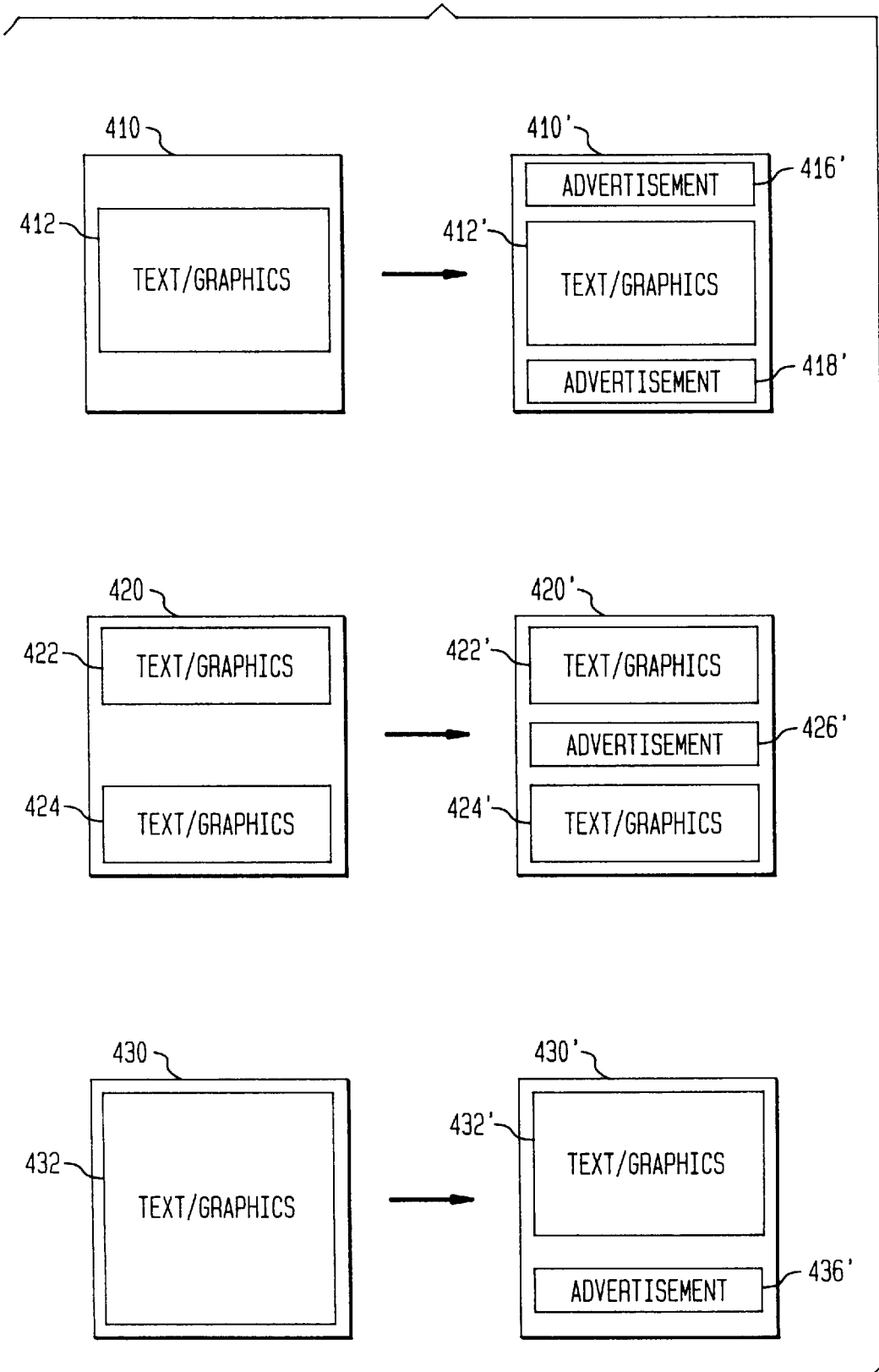
FIG. 4 contains examples of how Web pages could be modified according to an embodiment of the present invention.

FIG. 4 contains examples of how Web pages could be modified according to an embodiment of the present invention. If an original Web page 410 has empty areas above and below a text and graphic region 412, advertisements 416', 418' could be positioned above and below the text and graphic region 412' on a modified Web page 410'. Similarly, if an original Web page 420 has an empty area between two text and graphic regions 422, 424, an advertisement 426' could be added between the two text and graphic regions 422', 424' on a modified Web page 420'. If a text and graphic region 432 takes up substantially all of an original Web page 430, leaving no room for an advertisement, a smaller text and graphic region 432' could be used on a modified Web page 430' to create space for an advertisement 436'.

Referring again to FIG. 1, in the above description it has been assumed that the server 200 selects the advertisement, examines the original Web page 400 to determine how the advertisement should be added, and modifies the HTML data. It is possible, however, that all of these steps can be performed instead at the user's PC 500. This approach might be desirable because the user's PC 500 already makes layout determinations with an HTML parsing and rendering engine when displaying Web pages. The user's PC 500 can also take the size of the browser window into account when deciding where to place the advertisement, something not readily possible at the server 200.

In order for the user's PC 500 to select an advertisement, however, advertisement information should be downloaded to the PC 500 from, for example, the ISP 600 or server 200. These "candidate" advertisements could be sent using extended Markup Language (XML) defined tags. The Channel Definition Format (CDF) could be used to define a channel between the server 200 and the user's PC 500 through which advertising information can be delivered and pre-cached at the PC 500. Of course, instead of placing all of the logic disclosed herein in either the ISP 600, server 200 or PC 500, the logic can be dispersed among these systems in any number of ways.

Although various embodiments are specifically illustrated and described herein, it will be appreciated that modifications and variations of the present invention are covered by the above teachings and within the purview of the appended claims without departing from the spirit and intended scope of the invention. For example, although only a limited number of methods for placing an advertisement on a Web page are shown and described with respect to FIG. 4, it can be appreciated that any number of other methods can be used instead and still fall within the scope of the invention.

What is claimed is:

1. A method of modifying an information page transmitted in a communications network, comprising the steps of:
   receiving a request to display the information page from a client computer in the communications network;
   obtaining information page data for the requested information page;
   determining attributes of the requested information page based on the obtained information page data;
   selecting an advertisement to be included on the information page;
   modifying the information page data to include the selected advertisement based on the attributes of the requested information page; and
   sending the modified information page data to the client computer for display.

2. The method of claim 1, wherein the communications network is the Internet.

3. The method of claim 2, wherein the information page is a World Wide Web page.

4. The method of claim 3, wherein said step of modifying the information page data is performed by modifying hypertext markup language data to create a modified hypertext markup language data.

5. The method of claim 2, wherein said steps of receiving, obtaining, selecting, modifying and sending are performed by a central server computer.

6. The method of claim 2, wherein the central server computer is located at an Internet service provider.

7. The method of claim 2, wherein said steps of receiving, obtaining, selecting, modifying and sending are performed by an application residing on the client computer.

8. The method of claim 7, further comprising the step of:
   downloading additional advertisement candidates from an advertisement repository database to the client computer,
   wherein said step of selecting the advertisement is performed by selecting at least one of the additional advertisement candidates.

9. The method of claim 8, wherein said step of downloading is performed using channel definition format protocol.

10. The method of claim 1, wherein said step of selecting the advertisement is performed by selecting the advertisement from an advertisement repository database.

11. The method of claim 10, wherein the attributes of the requested information page include the presence and location of text and graphics on the information page as indicated by the hypertext markup language data.

12. The method of claim 11, wherein the attributes of the requested information page include the colors of the text, graphics and background on the information page as indicated by the hypertext markup language data.

13. The method of claim 10, wherein said step of selecting the advertisement is performed using an information page request history database.

14. The method of claim 10, wherein said step of selecting the advertisement is performed using a user profile database.

15. The method of claim 14, wherein said step of selecting the advertisement is performed using a demographic database.

16. An apparatus for modifying hypertext markup language data transmitted over the Internet, comprising:
   means for receiving a request to display an information page from a client computer;
   means for obtaining the hypertext markup language data for the requested information page;
   means for determining attributes of the requested information page based on the obtained hypertext markup language data;
   means for selecting an advertisement to be included on the information page;
   means for modifying the hypertext markup language data to include the selected advertisement based on the attributes of the requested information page; and
   means for sending the modified hypertext markup language data to the client computer for display.

17. The apparatus of claim 16, wherein said means for selecting selects the advertisement from an advertisement repository database.

18. The apparatus of claim 17, wherein said means for receiving, obtaining, selecting, modifying and sending are located at an Internet service provider central server computer.

19. The apparatus of claim 17, wherein said means for receiving, obtaining, selecting, modifying and sending reside on the client computer.

20. A computer readable medium having stored thereon instructions which, when executed by a processor, cause the processor to perform steps for modifying hypertext markup language data transmitted over the Internet, said steps comprising:
   receiving a request to display an information page from a client computer;
   obtaining the hypertext markup language data for the requested information page;
   means for determining attributes of the requested information page based on the obtained hypertext markup language data;
   selecting an advertisement to be included on the information page;
   modifying the hypertext markup language data to include the selected advertisement based on the attributes of the requested information page; and
   sending the modified hypertext markup language data to the client computer for display.

21. The computer readable medium of claim 20, wherein said step of selecting the advertisement selects the advertisement from an advertisement repository database.

22. The computer readable medium of claim 21, wherein said steps of receiving, obtaining, selecting, modifying and sending are performed by an Internet service provider central server computer.

23. The computer readable medium of claim 21, wherein said steps of receiving, obtaining, selecting, modifying and sending are performed by an application residing on the client computer.

24. A method of modifying an information page transmitted in a communication network, comprising the steps of:
   receiving a request to display the information page from a client computer in the communication network;
   obtaining information page data for the requested information page;
   selecting an advertisement to be included on the information page;
   modifying the information page to include the advertisement based on at least one of the presence, location and color of at least one of text, graphics and a background included in the information page; and
   sending the modified information page data to the client computer for display.

25. The method of claim 24, wherein the information page data is hypertext markup language data and the additional data is an advertisement.

26. A method of modifying an information page transmitted in a communication network, comprising the steps of:

receiving a request to display the information page from a client computer in the communication network;

obtaining hypertext markup language data for the requested information page;

selecting an advertisement to be included on the information page;

modifying the hypertext markup language data for the requested information page to include the advertisement such that the display of the advertisement does not conflict with at least one of the presence, location and color of at least one of text, graphics and a background indicated by the obtained hypertext markup language data; and sending the modified hypertext markup language data for the requested information page to the client computer for display.

27. The method of claim 26, where said step of modifying comprises the further step of modifying one of the size, location and color of information included in the requested information page.

28. The method of claim 26, where said step of modifying comprises the further step of modifying one o the size, location and color of information included in the advertisement.

29. A system for modifying an information page data associated with an information page, the information page data including a specific attribute, the information page data transmitted in a network, comprising:

a user computer communicating with the network through an ISP;

an server communicating with the ISP including:
  an advertisement database including an advertisement;
  a history database including history information;
  a user profile database including user information;
  a demographic database including demographic information;

a computer readable medium having stored thereon instructions which, when executed by a processor, cause the processor to perform the following steps:
  selecting the advertisement from the advertisement database;
  examining the information page data;
  determining the specific attribute;
  deciding how to add the advertisement to the information page based on the specific attribute and the advertisement;
  modifying the information page data into a modified information page including the information page data and the advertisement;
  sending the modified information page to the user computer for display.

30. The system of claim 29, wherein the deciding step is based on demographic information.

31. The system of claim 29, wherein the deciding step is based on history information.

32. The system of claim 29, wherein the deciding step is based on user information.

* * * * *